US007225969B2

(12) United States Patent
Chen et al.

(10) Patent No.: US 7,225,969 B2
(45) Date of Patent: Jun. 5, 2007

(54) FRICTION STIR PROCESSING FOR SURFACE PROPERTIES

(75) Inventors: Yen-Lung Chen, Troy, MI (US); Thomas Arthur Perry, Bruce Township, MI (US); Yang-Tse Cheng, Rochester Hills, MI (US); Anita M. Weiner, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/009,405

(22) Filed: Dec. 10, 2004

(65) Prior Publication Data

US 2006/0124701 A1 Jun. 15, 2006

(51) Int. Cl.
*B23K 20/12* (2006.01)
*B23K 31/02* (2006.01)

(52) U.S. Cl. .................................... 228/112.1; 228/2.1
(58) Field of Classification Search ............. 228/112.1, 228/2.1
See application file for complete search history.

(56) References Cited

U.S. PATENT DOCUMENTS

| 6,398,883 | B1 * | 6/2002 | Forrest et al. ............... 148/516 |
| 6,421,578 | B1 * | 7/2002 | Adams et al. ............... 700/212 |
| 6,780,525 | B2 * | 8/2004 | Litwinski ..................... 428/615 |
| 6,843,404 | B2 * | 1/2005 | Litwinski et al. ............. 228/2.1 |
| 6,866,180 | B2 * | 3/2005 | Mahoney et al. ......... 228/112.1 |
| 6,905,060 | B2 * | 6/2005 | Van Aken et al. ........ 228/112.1 |
| 6,923,362 | B2 * | 8/2005 | Mishra ..................... 228/112.1 |
| 2004/0050907 | A1 * | 3/2004 | Dracup et al. ............ 228/112.1 |
| 2006/0037992 | A1 * | 2/2006 | Slattery .................... 228/112.1 |

* cited by examiner

*Primary Examiner*—Lynne R. Edmondson
(74) *Attorney, Agent, or Firm*—Kathryn A. Marra

(57) ABSTRACT

A surface of an article is heated and subjected to pressure by operation of a friction stir tool. The pressure of the face of the tool on the article surface, and the speed of rotation of the tool and of its progression along the surface of the article, are controlled to progressively hot-work a specified surface area. The face of the tool may be round and have a profiled, axially extending, smaller diameter pin for higher concentration of frictional heat and load and for plasticizing a surface layer of the workpiece. Such hot work may be applied for reducing surface porosity or for producing another change in the surface microstructure, or for effecting another change in surface material properties.

3 Claims, 2 Drawing Sheets

FRICTION STIR PROCESSING FOR SURFACE PROPERTIES

TECHNICAL FIELD

This invention pertains to hot working or heat treatment of surfaces of articles to modify surface properties. More specifically, this invention pertains to practices of friction stir heating and working of such surfaces to densify or otherwise thermo-mechanically modify the properties of the surface layer.

BACKGROUND OF THE INVENTION

Many manufactured articles require surface properties that differ from the bulk properties of the material from which the article is made. Some products, such as automotive engine block castings have cylinder surface regions that experience continual frictional contact by reciprocating pistons and require wear resistance of a degree not inherent in the porous surface of the casting. Other articles could be made of lighter weight or lower cost materials, or by a lower cost manufacturing process, if the microstructure of a surface (such as a porous surface) could be altered to provide it with properties more preferred than the bulk properties of the material resulting from the manufacture of the article.

Friction stir welding is a solid-state welding process used, for example, to form a weld seam between abutting metal workpieces. A rotating tool with a profiled tip and of suitably hard material makes contact with the workpieces and is pushed or plunged into the joint region. The friction of the impinging and rotating contact heats and plasticizes the abutting regions of the metal workpieces. The metal is heated to a suitable depth for the weld, often substantially through the thickness of the abutting pieces. Plasticized material flows around the tool and coalesces behind the rotating tool as it is moved along the intended weld seam. Since only the joint area is heated by the moving and rotating tool, the flowing weld metal is re-hardened by heat loss to the adjacent unheated workpiece material.

It is now realized that a rotating tool like that used in friction stir welding could be utilized to hot work or otherwise thermally process a surface layer of an article to obtain desired physical and/or chemical properties in the selectively treated area. In other words, the rotating tool could be used in friction stir thermal processing of a selected surface area of an article.

SUMMARY OF THE INVENTION

Materials, such as metal alloys, are shaped into articles of manufacture by processes such as molding, casting, extrusion, or other forming processes that leave the product with microstructural characteristics that determine the physical properties of its body (or bulk) and surfaces. The choice of material and manufacturing method may leave the article with suitable bulk properties, but with properties in a surface layer region that are deficient in some respect. For example, some metal casting processes, powder metal processes and ceramic powder processes may result in products with surface porosity.

The practice of this invention is applicable to materials and articles in which a surface region can be momentarily heated and hot-worked by friction stirring and then cooled, usually by heat transfer to the underlying body of material, to reduce surface porosity or to produce another desired change in surface microstructure. Thus, the change in physical or chemical property, for example an increase in surface hardness, is caused by thermo-mechanical working of the surface region during friction stir processing.

A tool with a working face that is harder than the workpiece is used. The working face is suitably shaped to facilitate a desired surface treatment. For example, the working face may be flat or rounded for simple heat treatment of a surface. Or the working face may be formed with a reduced diameter tip, e.g. 1–3 mm in length for more concentrated initial frictional heating engagement with a workpiece surface. The purpose of initially contacting the workpiece with the rotating tip is to rapidly heat, penetrate, and plasticize the surface layer of the workpiece to start the localized deformation. The rotating face of the tool, like a shoulder to the tip portion, then contacts a broader region of the local surface of the workpiece to complete the intended thermo-mechanical processing of the thin surface layer. The rotating tool is moved over the surface of the workpiece to progressively treat a selected area. The treated surface may be heated and plasticized, or simply heated, to accomplish a desired surface modification. The rate of rotation and the pressure applied by the tool are predetermined to accomplish a desired change in a property of the treated surface layer.

The invention will be described in terms of friction stir processing of surfaces of certain aluminum alloy castings to reduce porosity in the surface layer, to increase its wear resistance, and/or to reduce its coefficient of friction. But the same or similar tools and methods can be used to thermally transform surfaces and other surface layer properties of other metallic and non-metallic articles.

DESCRIPTION OF PREFERRED EMBODIMENTS

The practice of the invention will be illustrated with respect to increasing the density and wear resistance and reducing the coefficient of friction of a cast article of an aluminum alloy such as AA B319. Aluminum alloy B319 is a casting alloy used, for example, in cylinder block, cylinder head and inlet manifold applications. The specified composition of B319 is, by weight, 5.5% to 6.5% silicon, 3.0% to 4.0% copper, 1.2% max iron, 0.8% max manganese, 0.1% to 0.5% magnesium, 0.5% max nickel, 1.0% max zinc, 0.25% max titanium, a total of 0.50% other metallic elements and the balance aluminum. This aluminum alloy has suitable properties for casting articles in high volume and to critical dimensions. The resulting castings have good bulk physical properties for their demanding applications. But in the case of cylinder block applications, the surface areas of the cylinder walls experience excessive scuff and wear from the reciprocating pistons in engine operation. This wear is attributed mainly to microstructural porosity in cylinder wall surfaces of the casting.

While applications to cylindrical surfaces are also contemplated, the practice of the invention will be illustrated first in its application to a flat surface.

Figure 1:
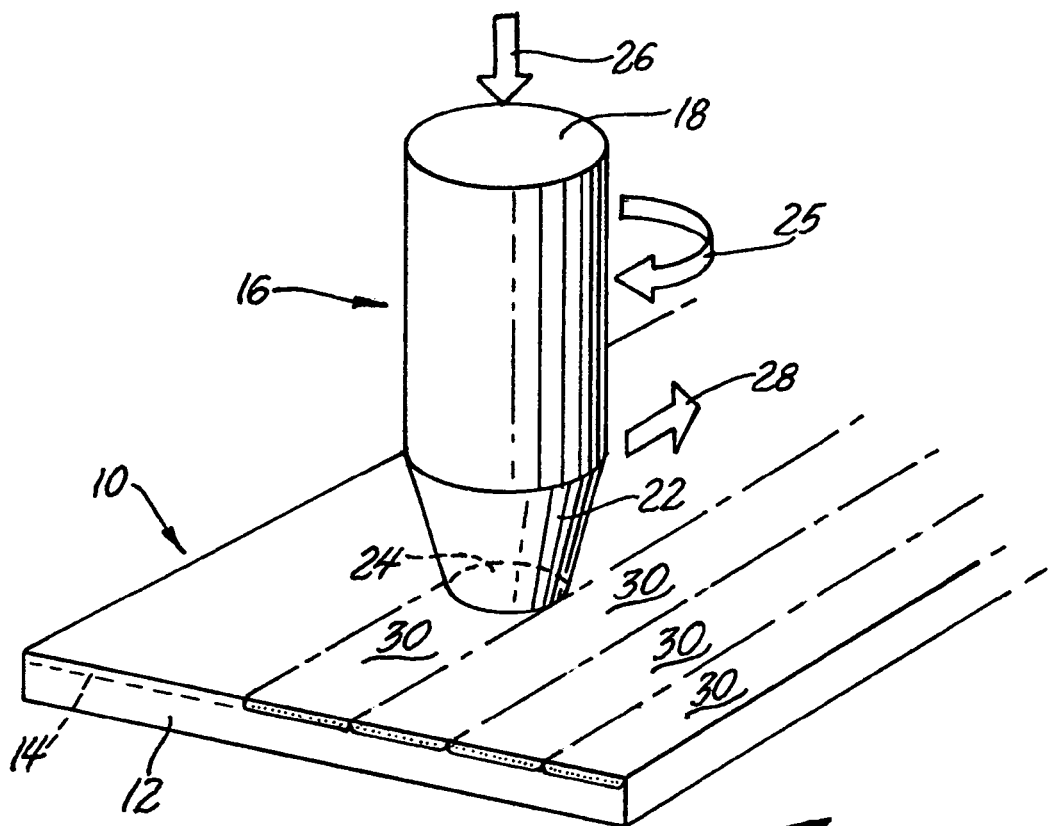
FIG. 1 is a schematic illustration of friction stir thermo-mechanical processing of a surface layer area of a flat, plate-like workpiece.

In FIG. 1, workpiece 10 is a plate or the upper portion of an article having a body portion 12 with a surface layer 14. Workpiece 10 may, for example, be a surface layer and underlying body portion of an AA 319 casting. The rate of solidification of body portion 12 and surface portion 14 of casting 10 was such that surface layer 14 is microporous (the porosity is not illustrated in the drawing figures). In some product applications of such castings it may be necessary to densify the surface layer 14 of workpiece 10 to a depth, for example, of two millimeters. A friction stir tool 16 will be used to hot work surface layer 14 to increase its density and wear resistance.

Friction stir tool 16 is secured at its upper end 18 in the chuck (nor shown) of a known computer controlled machine, not shown. In this embodiment of the invention, the bottom end 22 of friction stir tool 16 is illustrated as a truncated cone with a round, flat or curved face 24 for frictional engagement with surface layer 14 of workpiece 10. In other embodiments of the invention, as will be illustrated in FIG. 4, the face of the friction tool may include a profiled pin, often of suitable cylindrical or conical configuration protruding from the main face of the tool (such as round face 24 in FIG. 1). The function of such a pin is to provide initial highly localized pressure and frictional heat when the friction stir tool engages the workpiece surface. For example, such a pin may have a cylindrical or conical body, with or without threads or other profiles, and a flat or rounded end surface for plasticizing workpiece surface material while the main face of the tool (the shoulder of the pin) compacts and densifies the plasticized material.

Referring again to FIG. 1, the computer-controlled machine rotates friction stir tool 16 as indicated by arrow 25, while pressing tool face 24 (as indicated by arrow 26) against workpiece surface 14. Friction stir tool 16 is also translated along surface 14 as indicated by arrow 28. The pressure of engagement, speed of rotation and speed of translation are all predetermined to suitably impose hot work on a band 30 of original surface 14, densifying and hardening it. The width of band 30 is about the same as the diameter of round tool face 24; however, the bands may be overlapped depending on the progressive path of tool 16. As illustrated in FIG. 1, friction stir tool 16 is proceeding on its fourth band 30 across surface layer 14 as it progressively and systematically thermo-mechanically processes all, or a selected portion, of surface layer 14.

Thus, the frictional heat generated by friction stir tool 16 in surface layer softens the surface layer in successive bands 30. And the pressure applied by tool 16 at its tool surface 24 deforms and hot-works the original microporous surface layer, densifying it to a suitable level of wear resistance and durability.

For example, a tool such as friction stir tool 16 was used to process a flat surface of an AA B319 cast block. The tool had a round face with a diameter of ten millimeters. In this example, the tool face included a threaded cylindrical pin centered on and protruding about two millimeters from the face. The pin had a diameter of about three millimeters. The tool was pressed vertically with a force of 4.2 kN against a horizontal surface of the cast block and rotated at 1800 rpm. The rotating tool was moved in a linear path over the surface at a speed of 8 mm/sec.

The hardness of untreated portions of the cast AA319 surface was 90 HV. The hardness of the friction stir treated surface portions was 110 HV. The porosity of the untreated surface was 2.7% while the porosity of the friction stir treated areas was reduced to 0.2%. The treated portions of the cast surface had lower coefficients of friction (0.2 to 0.5) as compared to untreated surfaces (0.5 to >1). And the friction stir treated areas of the cast block experienced less than half the wear rates sustained in the untreated surface regions.

Figure 2:
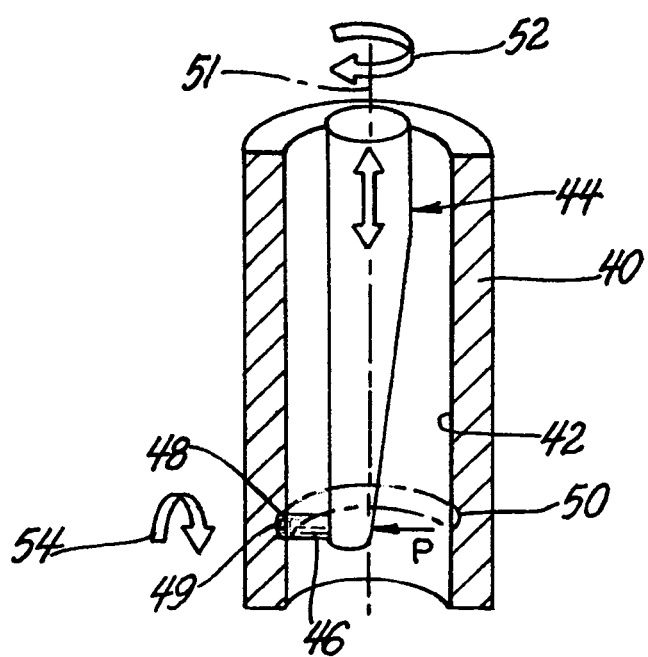
FIG. 2 is an illustration, in cross-sectional view, of friction stir thermo-mechanical processing of an internal cylindrical metal surface such as could be treated in an aluminum alloy casting for an automotive engine block.

In FIG. 2 the practice of the invention is illustrated where it is desired to thermo-mechanically work the internal cylindrical surface 42 of a cast cylinder 40. In a practical application, cylinder 40 could be a portion of a cast AA B319 cylinder block for a reciprocating piston, internal combustion engine. In this embodiment, friction stir tool 44 is L-shaped and has a radial arm 46 with a face surface 48 that is suitably profiled for engagement with circular bands 50 on internal cylindrical surface 42. The friction stir movement of friction stir tool 44 is controlled by a computer-controlled machine, not shown.

In this embodiment, friction stir tool 44 is rotated around the axis 51 of cylindrical surface 42 as indicated by arrow 52. Arm 46 may also have a profiled pin as described above and be geared (mechanism not shown in FIG. 2, but illustrated in FIG. 3) for rotation (indicated by arrow 54) as tool 44 presses in a radially outward direction (arrow P). Rotating face 48 is thus brought into friction stir contact with cylinder wall surface 42 in band 50. As tool 44 completes one internal circumferential band 50 it is raised or lowered by the powered machine to hot-work a successive band. In this way, the portion of internal cylindrical surface 42 that is subjected to piston wear is progressively hot worked by friction stir tool 44. Alternatively, the L-shaped tool 44 with rotating arm 46 can be moved along the cylinder bore axis 51 to produce an axial band as illustrated in FIG. 4. The axial band extends along the path traversed by a piston. Tool 44 is then rotated a small arc about cylinder bore axis 51 to repeat the same axial traverse of the internal cylinder wall in an overlapping manner with a desired overlap width. Preferably the friction stir tool 44 is moved in such a way that the rotating face 48 traverses in a right-hand or left-hand thread direction along the cylindrical surface 42. This way friction stir processing can be done continuously. As described in the above example, this hot-working of the surface of a workpiece, such as a microporous aluminum alloy casting, densifies it and increases its wear resistance, and often reduces its coefficient of friction.

Figure 3:
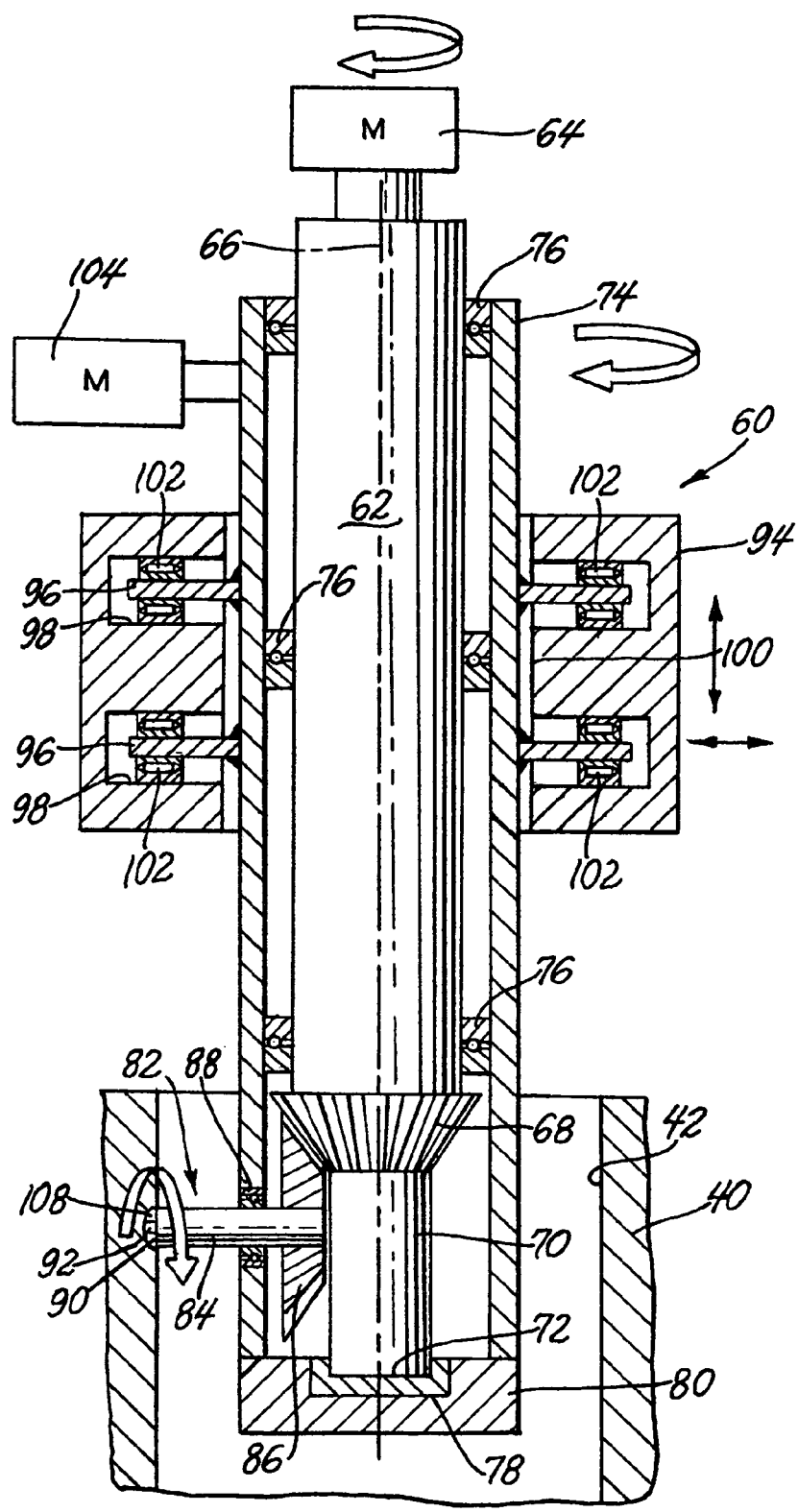
FIG. 3 is a cross-sectional view of a tool for thermo-mechanical processing of the cylinder wall of a cast cylinder block for an engine.
Figure 4:
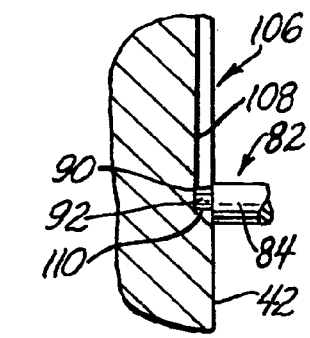
FIG. 4 is a somewhat enlarged view of the working face of a tool like that in FIG. 3 engaging a cylinder wall surface.

FIG. 3 illustrates in more detail (than tool 44 illustrated in outline in FIG. 2) a friction stir machine 60 for thermo-mechanical friction stir processing of an internal cylindrical surface 42 of, for example, a cast aluminum alloy engine cylinder block 40. Friction stir machine 60 has a central round shaft 62 rotatable by motor 64 about longitudinal axis 66. In FIG. 3, axis 66 is shown vertically because cylinder 42 in casting 40 is oriented vertically. However, it is to be understood that the practice of this invention is not limited to a specific orientation or attitude of a friction stir machine and workpiece.

Axial shaft 62 includes an intermediate 90° bevel gear 68 and a lower shaft portion 70. Axial shaft 62 is enclosed in tool housing 74 and rotatably supported in tool housing 74 by bearings 76 (three shown). Lower shaft portion 72 is rotatably supported in thrust bearing 78 in end cap 80 of machine housing 74.

Also supported by tool housing 74 is rotatable friction stir tool 82 for friction stir processing engagement with internal cylindrical surface 42 of casting 40. Friction stir tool 82 comprises a shaft 84 with 90° bevel gear 86 fixed to one end. Shaft 84 is carried in and extends through the lower end of tool housing 74. Bearing 88 supported in a suitable opening in tool housing 74 permits low frictional rotation of shaft 84. Bevel gear 86 engages bevel gear 68 on axial shaft 62 and, thus, rotatable friction stir tool 82 extends radially with respect to central shaft 62 and is driven by rotation of shaft 62. Friction stir tool shaft 84 has a friction stir face 90 at its end opposite bevel gear 86. Friction stir tool face 90 and pin 92 (see also FIG. 4) are rotated at a predetermined speed by friction stir machine 60 and pressed into frictional contact with cylindrical surface 42 of casting 40. In the operation of friction stir machine 60, its central axis 66 lies generally parallel to the cylindrical axis of workpiece casting 40.

Tool housing 74 is supported for rotation and axial displacement by cylindrical machine frame 94. Two support rings 96 are welded to the outer circumference of housing 74. Support rings 96 are received in circular slots 98 extending radially from the internal cylindrical surface 100 of machine frame 94. Machine frame slots 98 contain bearings 102 that receive support rings 96. Thus, housing 74 can be rotated within machine frame 94 by action of motor 104. Also, as viewed in FIG. 3, machine frame 94 can be actuated by suitable means, not shown, to position friction stir machine 60 for friction stir processing of internal cylinder surface 42 of casting 40.

Friction stir machine 60 is, thus, capable of being inserted into a round hollow in a casting or other workpiece for friction stir thermo-mechanical processing of an internal cylindrical surface such as surface 42 in FIGS. 2–4. Movement of machine frame 94 locates and presses friction stir tool face 90 and pin 92 against a selected area or region of cylindrical surface 42 that is to be treated. Rotation of central shaft 62 by its drive motor 64 in turn drives friction stir tool 82 at a suitable rate of rotation. When friction stir machine 60 is to form successive circumferential hot-worked bands 50 (see FIG. 2), tool housing 74 is rotated by its drive motor 104 so as to progressively form the desired band. After a circumferential band 50 has been completed, machine frame 94 is raised (or lowered) to form additional bands 50 until a predetermined region of surface 42 has been suitably densified and hardened.

Friction stir machine 60 is also capable of making progressive axial friction stir processed strips 106 as illustrated in FIG. 4. In this practice the machine frame positions friction stir tool face 90 and pin 92 at a predetermined sector of surface 42 and moves tool 82 along the axis of the sector (vertically as the machine and workpiece are shown in FIGS. 2 and 3) to complete a desired path. Housing 74 is then rotated to start an adjoining sector path and successive paths formed up and down the cylindrical axis until a selected circumferential region has been processed.

Alternatively, the rotational speed of tool housing 74 and the traversing speed of machine frame 94 along longitudinal axis 66 are coordinated in such a manner that a friction stir processed strip can be formed in a spiral or helical fashion. In this way, the friction stir processed band is continuously formed over the desired area.

The action of friction stir tool shaft 84, and its face 90 and axially extending pin 92, on a workpiece surface (such as internal cylinder surface 42) is illustrated schematically in FIG. 4. The relatively high pressure of the relatively small diameter pin 92 permits it to plasticize and penetrate a millimeter or so of the workpiece surface to stir and densify it (region 108). Preferably the diameter of the pin 92 is no greater than about half the diameter of the face 90 or shoulder portion of shaft 84. And preferably the axial length of pin 92 is no greater than its diameter. The circumferential surface 110 of pin 92 may be threaded or profiled for enhancing its hot working effect on the surface layer of the workpiece. The face portion 90 of rotating shaft 84 helps to compact the material in region 108. As the tool 82 is progressively lowered (as seen in FIG. 4), while still rotating, successive regions 108 are formed along the axially descending path of the friction stir tool 82.

The practice of the invention is readily adapted to virtually any workpiece surface configuration by adapting the shape of the friction stir tool and its surface, and by controlling the motion of the machine that powers the tool. This friction stir hot-working process can be adapted to any workpiece surface material that can be heated and densified by the pressure of a rotating tool face. Metal castings often have porous surface layers resulting from the solidification of the cast material. Porous casting layers can be densified by the friction stir process of this invention. But other materials produced by other processes can also benefit from frictional thermo-mechanical processing. For example, articles made by compacting and sintering metal particles may have residual surface porosity that can be eliminated by friction stir processing as described. And ceramic articles made by consolidation of ceramic particles may have surface porosity remedied by friction stir processing. The friction-stir process may also be used for hardening and/or increasing the wear resistance of a surface or altering its coefficient of friction.

The hardening effect produced by friction stir processing of aluminum castings is due to the reduction in porosity and the introduction of very small, recrystallized grains (grain refinement effect). In the following example of surface hardening effect for un-hardened plain carbon and low alloy steels by friction stir processing is due to different mechanisms. During friction stir processing, the temperature in the steel materials around the tool is quite high (can be greater than 1000° C.). Upon cooling the heat generated in this area is extracted relatively rapidly by the underlying large mass of bulk material, resulting in a quenching effect for the friction stir processed material. As a result, hard microstructural constituents such as martensite and bainite may form in the friction stir processed area and in the material in its immediate vicinity. For example, an annealed SAE1035 steel plate with an initial hardness of about 180 HV, can be friction stir processed to a hardness value of 250 HV or higher.

Sometimes local softening of a hardened material may be desired, for example, for ease of manufacturing like bending and forming, while retaining the hardened material for the rest of material (In this case, a through-thickness treatment instead of a surface treatment may be needed for the desired effect). For example, a heat-treatable aluminum alloy such as AA6061, commonly heat-treated to a peak hardness of about 105 HV by a T6 temper treatment for high strength, can be friction stir processed to a hardness of about 70 HV in a desired local area. The softening effect is due to the dissolution of the hardening precipitate particles. The heat-treat state effected by the friction stir thermo-mechanical processing can also produce desirable changes in other material properties, such as corrosion potential and electrical resistivity. For example, an AA2219 aluminum alloy, heat-treated to a T6 temper having a corrosion potential of −0.80V, can be friction stir processed to a T4 state to have a corrosion potential of −0.64V in the desired regions.

Thus, while the invention has been illustrated by certain examples, it is apparent that other ways of using friction stir thermo-mechanical processing to improve material surfaces could readily be adapted by those skilled in the art.

The invention claimed is:

1. A method of hot working a selected surface area of an internal cylindrical surface of an aluminum alloy cylinder block casting or a magnesium alloy cylinder block casting to produce a desired change in microstructure to a predetermined depth to increase the wear resistance of cylinder bores against piston wear, the internal cylindrical surface having an axis and a circumference, the method comprising:

heating and hot working the internal cylinder surface by radially pressing a face of a rotating tool against a selected portion of the cylindrical surface while controlling the speed of rotation of the tool and pressure applied by the tool face to the portion of the cylindrical surface to thermo-mechanically deform the article surface to the predetermined depth; and traversing the rotating tool in a combination of circumferential and axial paths over successive portions of the surface area to thus hot work the selected surface area.

2. A method of hot working a selected surface area of an internal cylindrical surface of an aluminum alloy cylinder block casting or a magnesium alloy cylinder block casting as recited in claim 1 in which the heating and hot working of the surface area is accomplished using a rotating tool with an axis of rotation and having a circular face centered on the axis of rotation, the face having a diameter for treating the portion of the surface area, the face having an axially protruding pin with a cross-section smaller than the diameter of the face, and the length of the protruding pin being determined for altering the article surface to the predetermined depth.

3. A method of hot working a selected surface area of an internal cylindrical surface of an aluminum alloy cylinder block casting or a magnesium alloy cylinder block casting as recited in claim 2 in which the rotating tool is driven by a rotatable shaft that is aligned with the axis of the internal cylindrical surface.

* * * * *